US012049176B2

(12) United States Patent
O'Neil

(10) Patent No.: US 12,049,176 B2
(45) Date of Patent: Jul. 30, 2024

(54) HIGH EFFICIENCY ELECTRICAL CONDUIT

(71) Applicant: Dana Automotive Systems Group, LLC, Maumee, OH (US)

(72) Inventor: Thomas M. O'Neil, Holland, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 504 days.

(21) Appl. No.: 17/360,997

(22) Filed: Jun. 28, 2021

(65) Prior Publication Data

US 2022/0410822 A1    Dec. 29, 2022

(51) Int. Cl.
*B60R 16/02*   (2006.01)
*H01B 7/08*    (2006.01)
*H01R 13/629*  (2006.01)
*H01R 13/648*  (2006.01)

(52) U.S. Cl.
CPC ........... *B60R 16/0215* (2013.01); *H01B 7/08* (2013.01); *H01R 13/629* (2013.01); *H01R 13/648* (2013.01)

(58) Field of Classification Search
CPC ...... H01R 35/04; H01R 35/00; H01R 13/648; H01R 13/629; H01B 7/08; B60R 16/0215
See application file for complete search history.

(56) References Cited

U.S. PATENT DOCUMENTS

| | | | |
|---|---|---|---|
| 7,637,761 B1 | 12/2009 | Arnold | |
| 2003/0102148 A1 | 6/2003 | Ohara et al. | |
| 2022/0410823 A1* | 12/2022 | O'Neil | ................ B60R 16/0215 |

FOREIGN PATENT DOCUMENTS

| | | | | |
|---|---|---|---|---|
| DE | 19750100 A1 * | 6/1999 | ........... | H01R 25/147 |
| EP | 2017924 A2 | 1/2009 | | |
| JP | 3794556 B2 | 7/2006 | | |

\* cited by examiner

*Primary Examiner* — Renee S Luebke
*Assistant Examiner* — Paul D Baillargeon
(74) *Attorney, Agent, or Firm* — McCoy Russell LLP

(57) ABSTRACT

Methods and systems are provided for an electrical harness. In one example, the electrical harness may include a first conductor coupled to a second conductor by a coupler where the conductors may be formed of plates arranged in parallel along a length of the first and the second conductors. The coupler may include electrical bridges of varying dimensions to maintain electrical continuity between the first conductor and the second conductor through the coupler.

15 Claims, 14 Drawing Sheets

HIGH EFFICIENCY ELECTRICAL CONDUIT

TECHNICAL FIELD

The present description relates generally to an electrical conduit for a vehicle.

BACKGROUND AND SUMMARY

Electrically-assisted vehicle operation is rising in popularity, thus motivating implementation of electrical components sufficiently robust to tolerate conditions associated with vehicle motion, thermal fluctuations, and packaging of vehicle components. The electrical components may include electrical cables adapted for high voltage applications and used to transfer energy between electrical sources, electrical modifiers, and devices consuming electrical energy. A flexibility of the high voltage cables maintains an electrical connection between both components that are stationary with respect to one another as well as components that are in relative motion.

The use of high voltage cables, however, may include drawbacks that reduce electrical efficiency and add to vehicle costs. For example, exposure of a magnetic field of the cables, the magnetic field generated during current flow therethrough, to electrically conductive materials and an electrical resistance of the cables may result in inductive losses. Articulation of the high voltage cables to couple the cables to the vehicle and/or position the cables around vehicle components may lead to degradation of the cable materials.

Furthermore, the high voltage cables may include complex and costly end connections. As an example, an end connection may include a terminal that is attached to an end of a cable via a method such as ultrasonic welding, brazing, magnetic pulse crimping, etc. The end connection may be enclosed within a plastic housing with a lower thermal tolerance than wires of the cable. Increased electrical resistance and losses incurred at the end connection may manifest as heat which may further exacerbate inductive losses. To counteract a rise in temperature beyond the thermal tolerance of the plastic housing, a size of the cable may be enlarged to allow the cable to act as a heat sink, thereby increasing a footprint of the cable.

Attempts to reduce a cost and complexity of the high voltage cable end connections include using a flat, laminated wiring material to form an electrical harness. One example approach is shown in Japanese Patent No. 3794556. Therein, a laminated flat wire coated with an electrically insulating resin may include a plurality of the laminated wiring material, arranged in parallel. The laminated flat wire may have a stack of protrusions formed by folding each of the plurality of laminated wiring material, thereby forming parallel conductive plates. The stack of protrusions may be connected to one another by staple-shaped terminals and the connected stack of protrusions may form a laminated wiring member to which electrical conductors may be coupled.

However, the inventors herein have recognized potential issues with such systems. As one example, the electrical harness formed by the laminated wiring member does not enable electrical conductors to be articulated without incurring cable fatigue or reduce bending of the electrical conductors as demanded based on positioning of the electrical conductors between electrical components. Furthermore, the electrical harness described in the '556 patent does not alleviate a thermal burden imposed at the electrical harness during current flow.

In one example, the issues described above may be addressed by an electrical harness, comprising a first conductor coupled to a second conductor by a coupler, each of the first and the second conductors formed of plates arranged in parallel along a length of the first and the second conductors, and wherein the coupler includes electrical bridges of varying dimensions to maintain electrical continuity between the first conductor and the second conductor through the coupler. In this way, inductive losses at the electrical harness are reduced and material fatigue of the electrical harness, and of an electrical conduit that includes at least one of the electrical harness, is minimized.

As one example, the plates of the first and second conductors may be enclosed in a rigid housing which circumvents random motion of the electrical harness. However, when the electrical harness extends between two electrical devices configured to move relative to one another, the relative motion may be accommodated by enabling rotation of the conductors around the coupler. The rigid housing may include inner passages for flowing a coolant therethrough, thereby decreasing an electrical resistance of the plates of the conductors. The coupler may include a plurality of electrical bridges, each electrical bridge configured to interface with one electrical phase of the electrical harness and maintain current flow along the electrical phase even when the conductors pivot around the coupler. As such, a cost of the electrical harness is reduced while a useful life of the electrical harness is prolonged.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 1-18 are shown approximately to scale.

DETAILED DESCRIPTION

Figure 1:
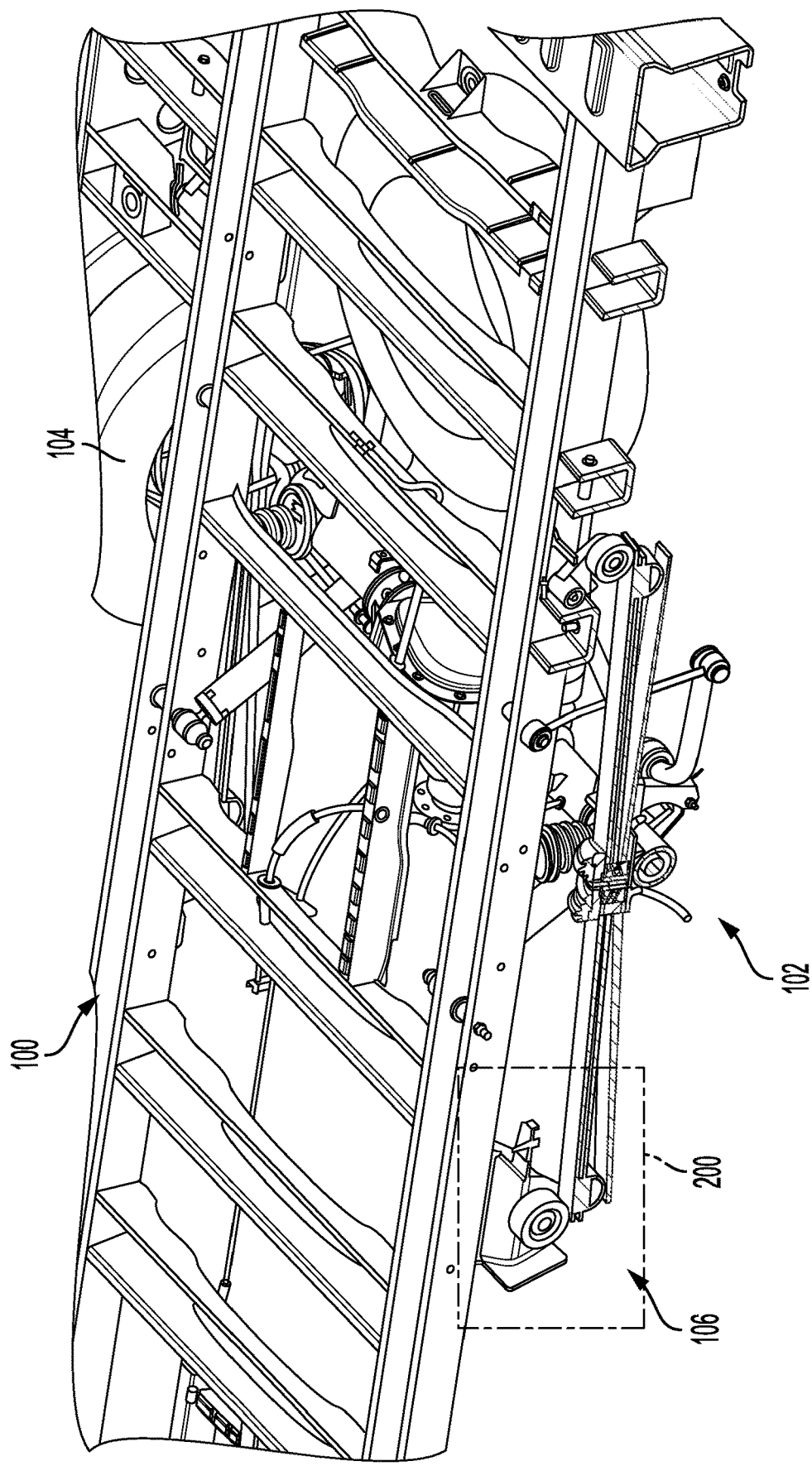
FIG. 1 shows an example of a region of a vehicle at which an electrical harness may be mounted.
Figure 2:
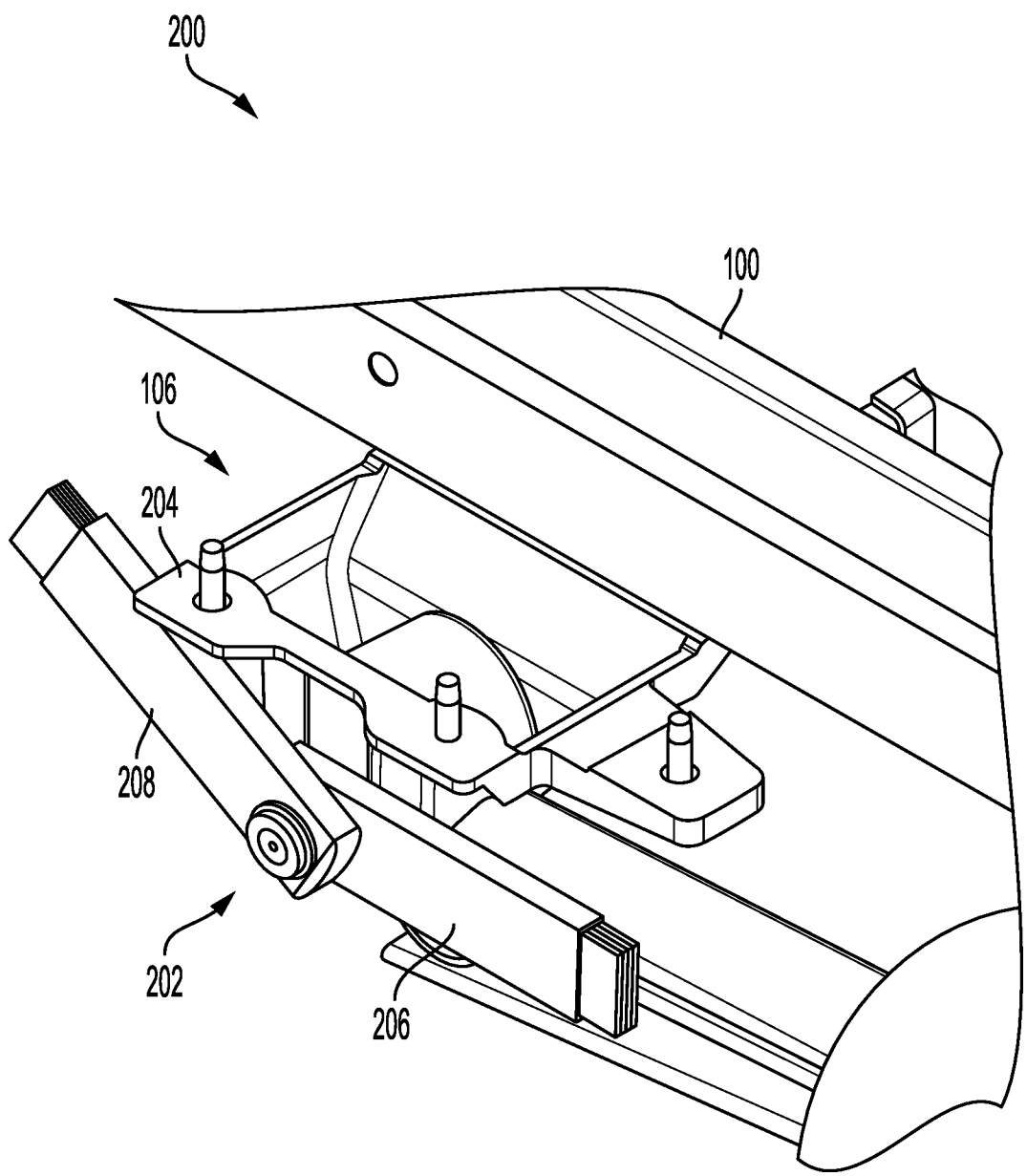
FIG. 2 shows an electrical harness mounted to the region of FIG. 1.
Figure 3:
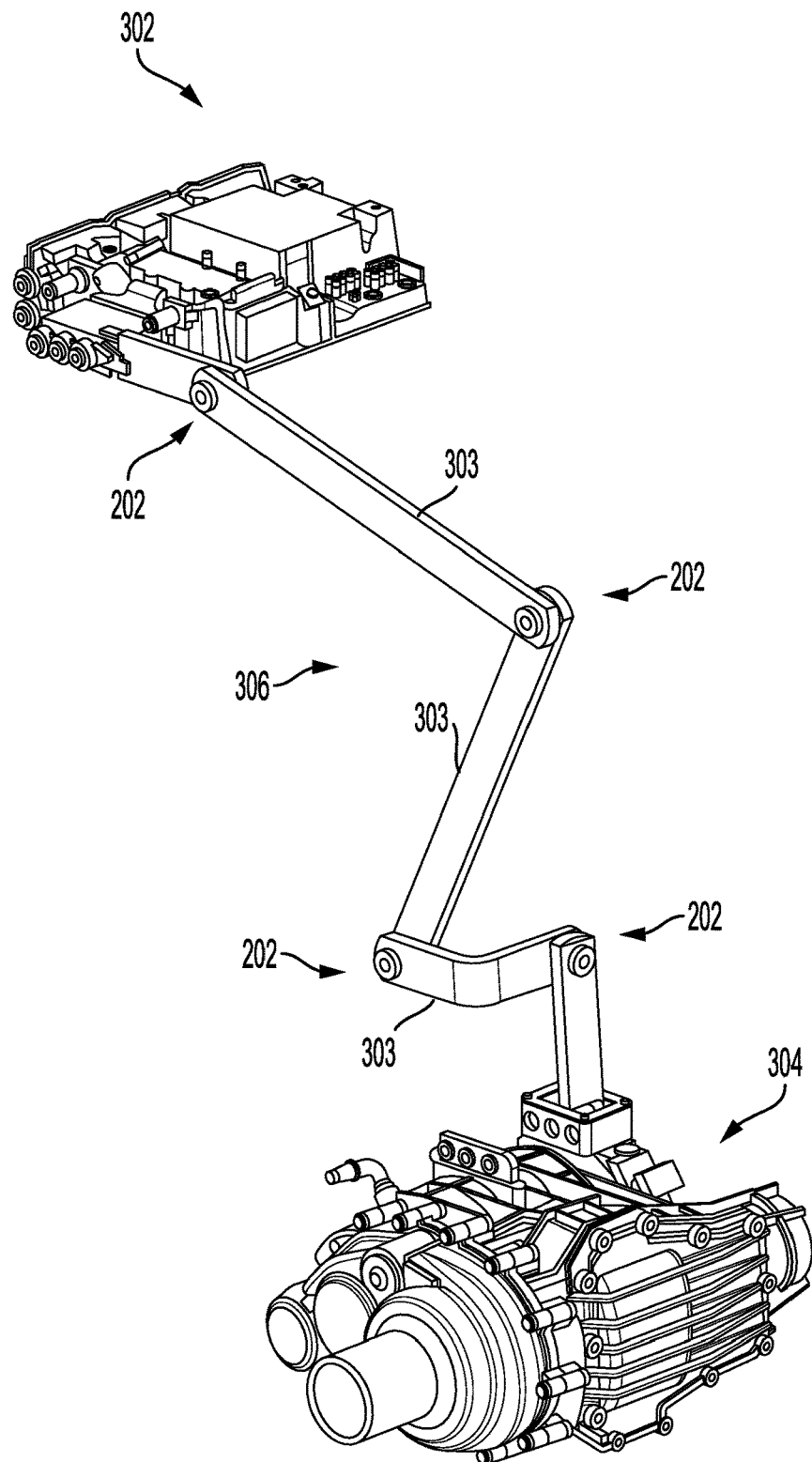
FIG. 3 shows an example of an electrical conduit formed of one or more of the electrical harness of FIG. 2.
Figure 4:
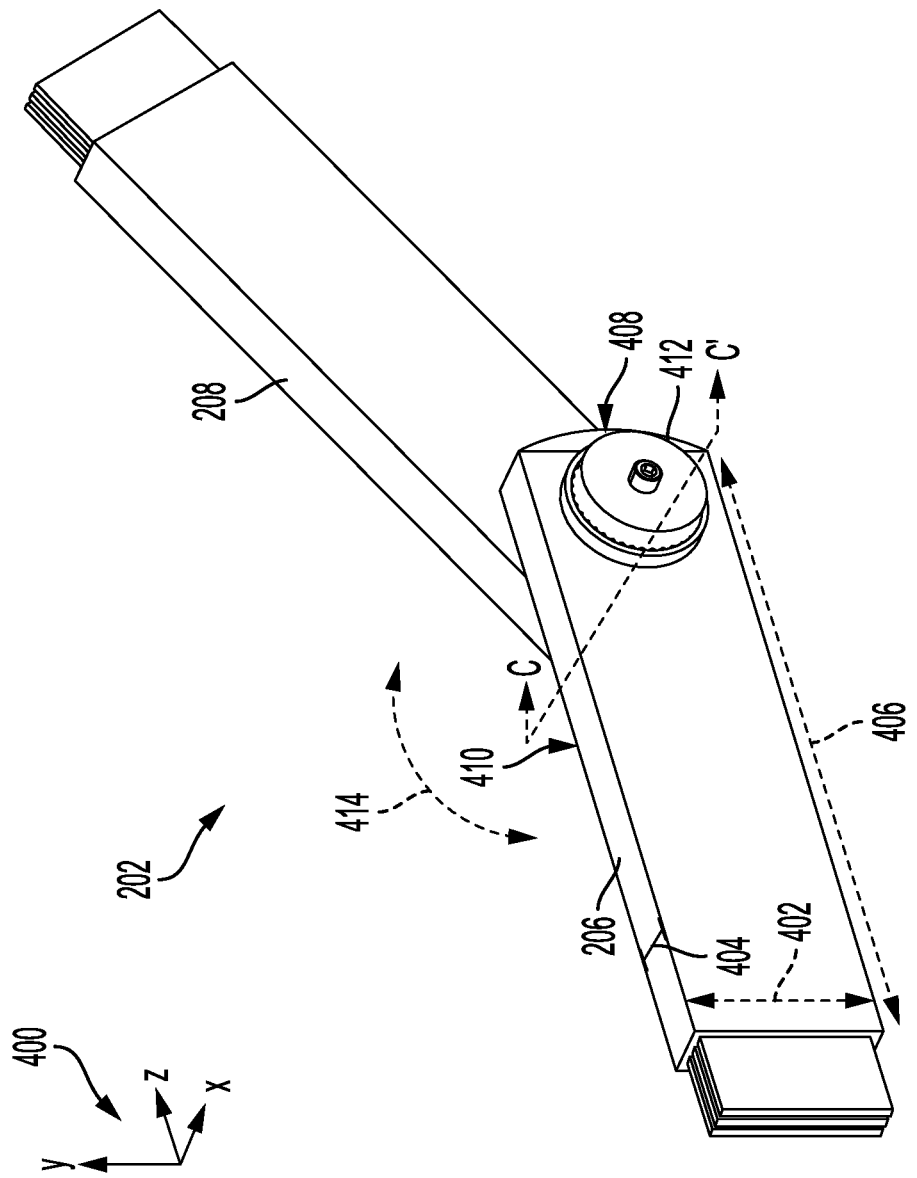
FIG. 4 shows a detailed view of the electrical harness of FIG. 2.
Figure 5:
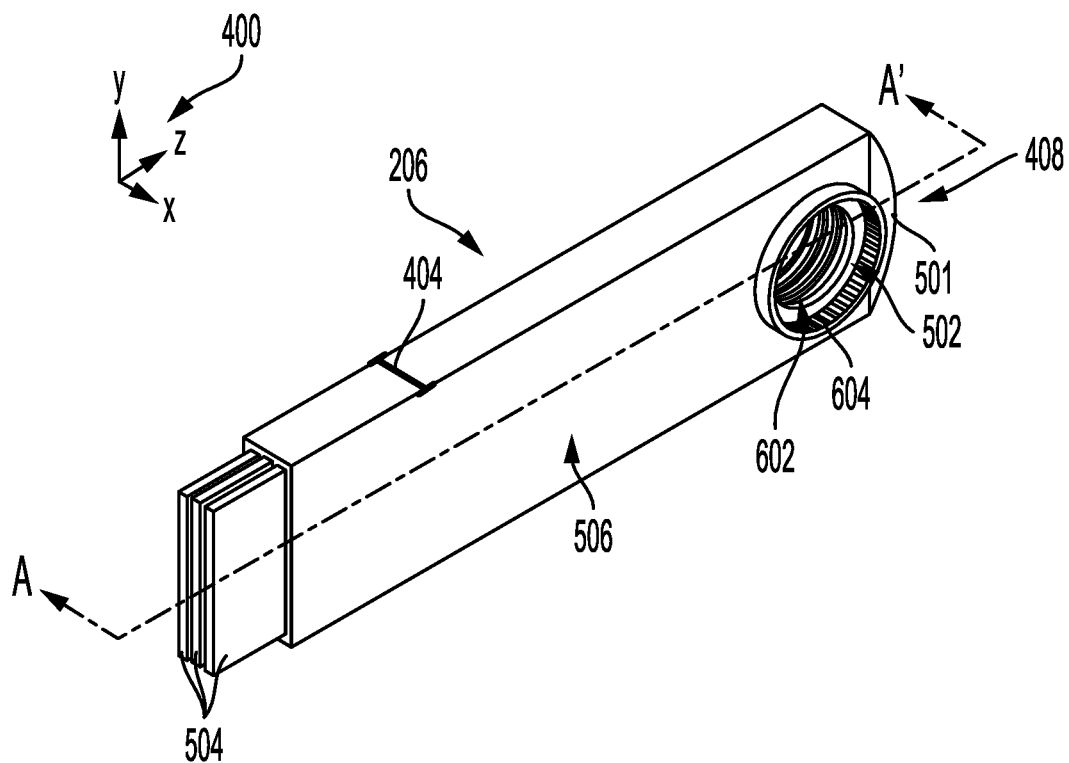
FIG. 5 shows a perspective view of a first example of a plate conductor of the electrical harness.
Figure 6:
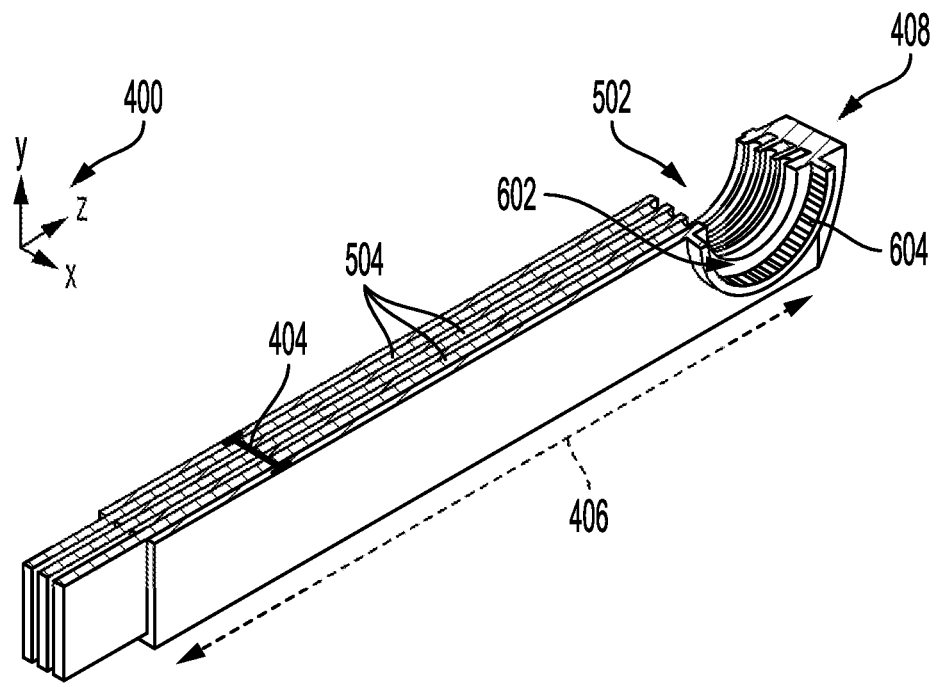
FIG. 6 shows a cross-section of the plate conductor of FIG. 5.
Figure 7:
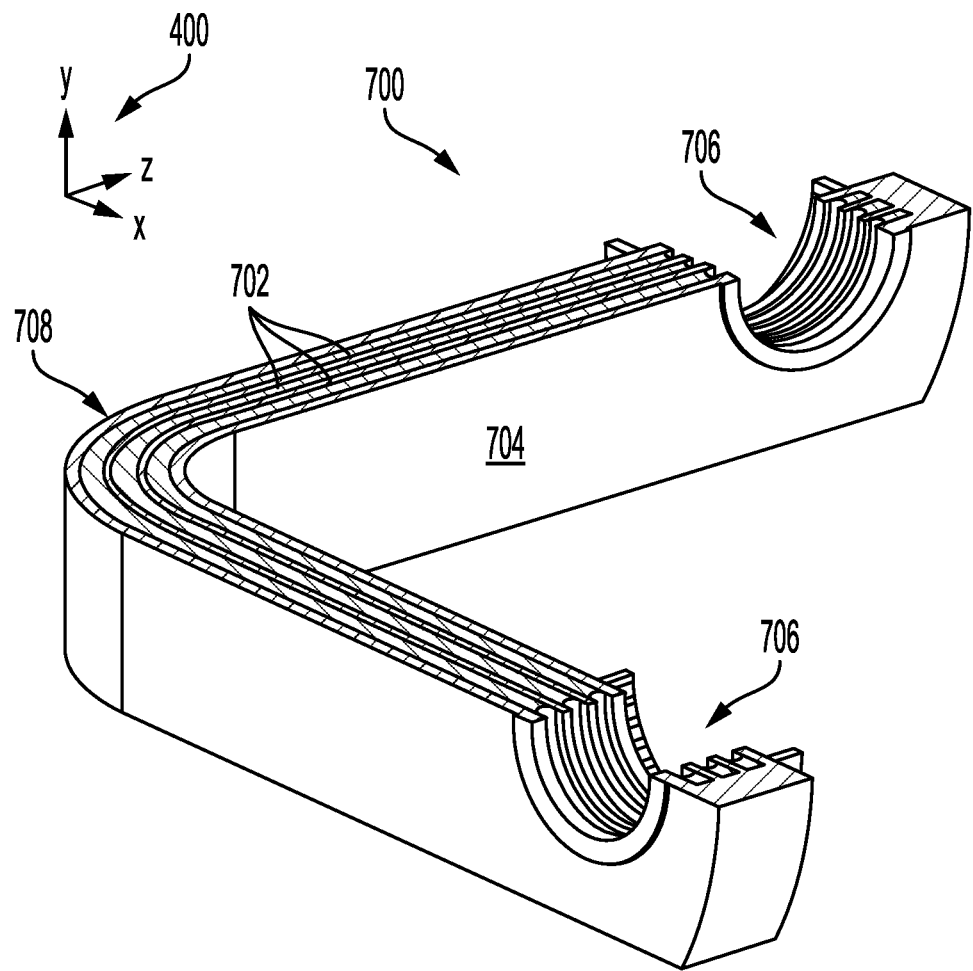
FIG. 7 shows a second example of a plate conductor.
Figure 8:
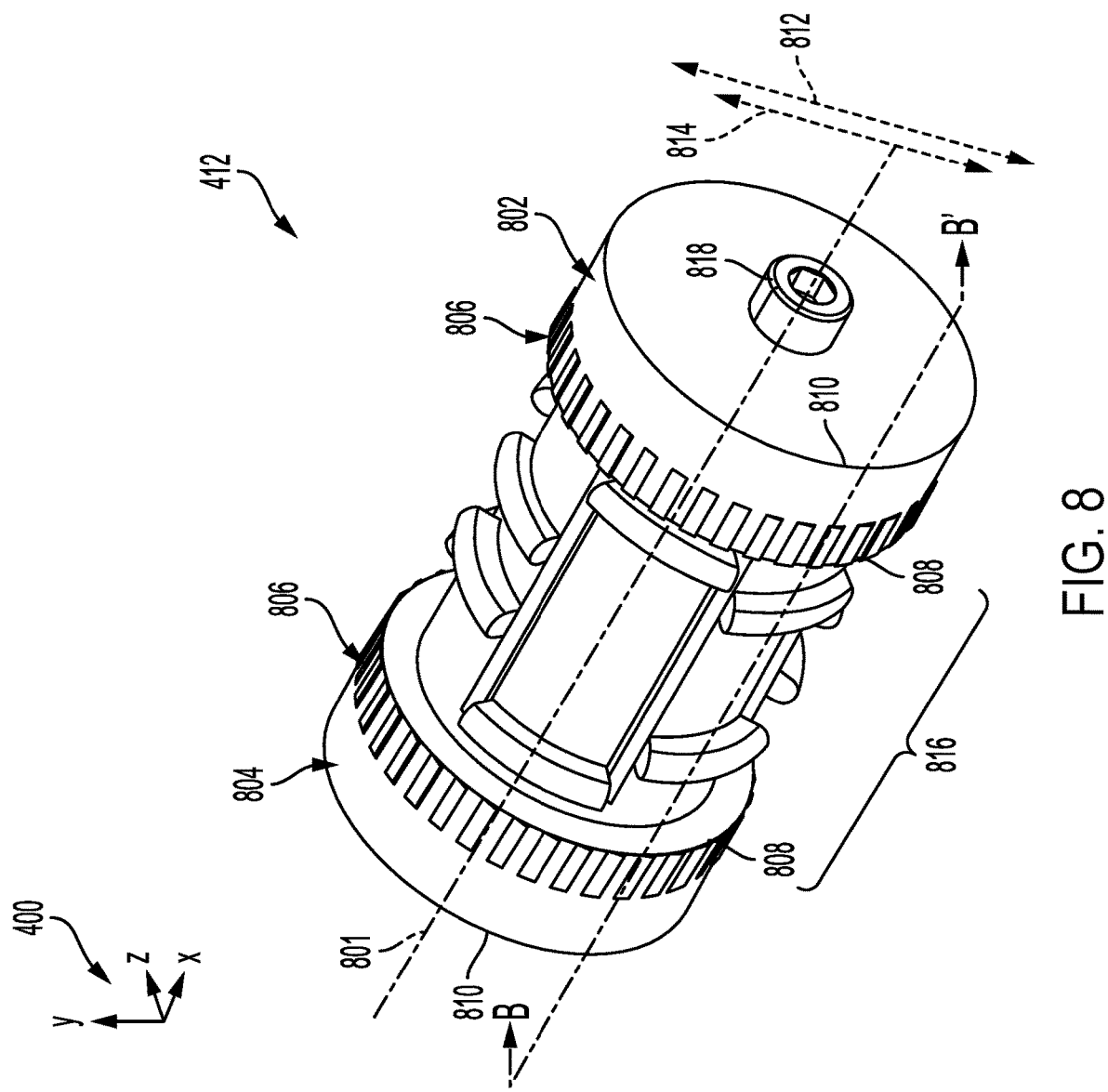
FIG. 8 shows an example of a coupler of the electrical harness of FIG. 2.
Figure 12:
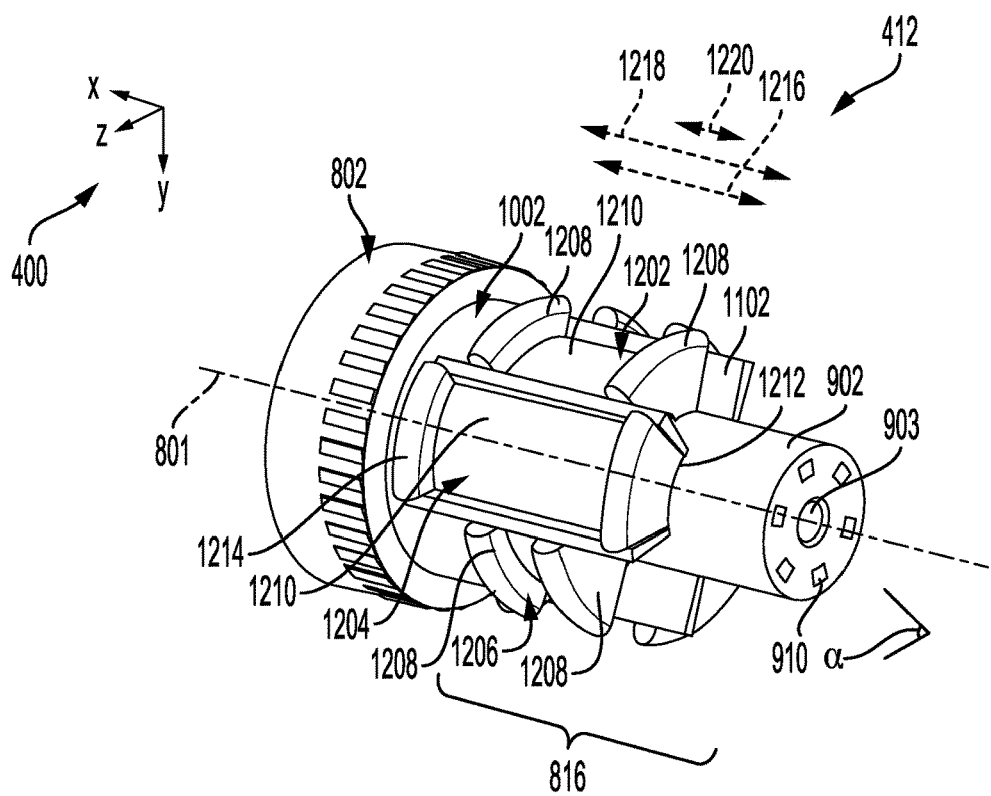
FIG. 12 shows a coupling of phase bridges to the journal of FIG. 9.
Figure 13:
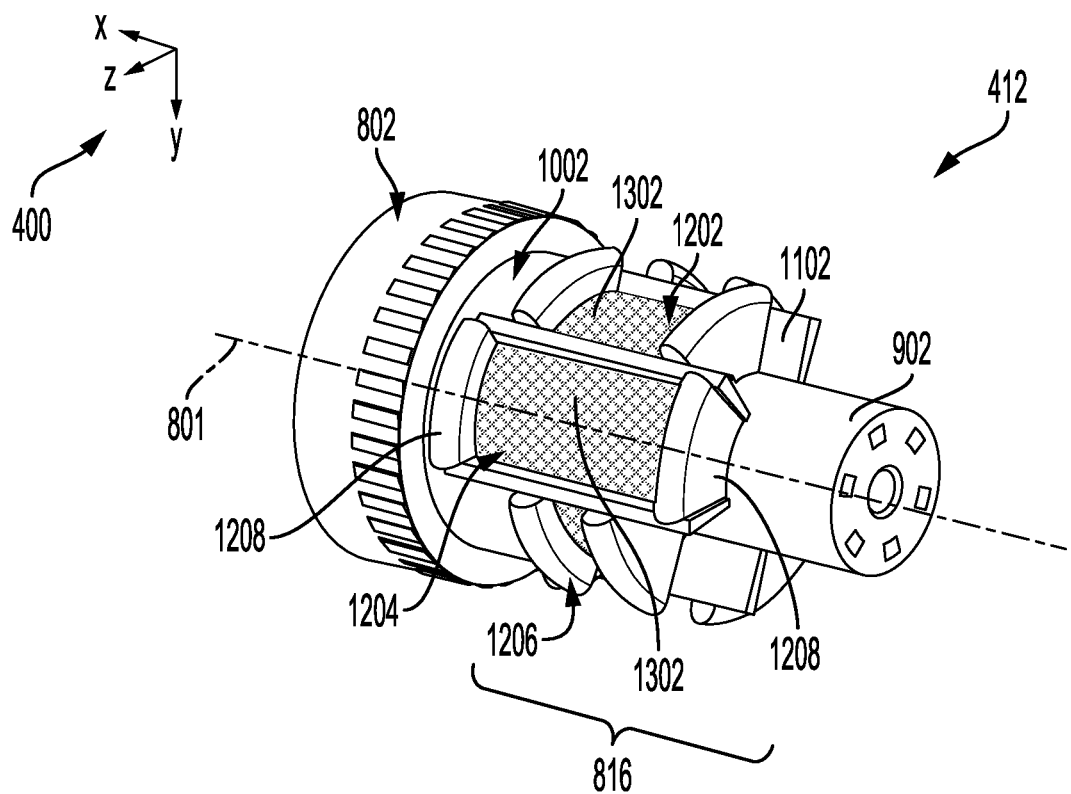
FIG. 13 shows a coupling of bridge insulators to the phase bridges of FIG. 12.
Figure 14:
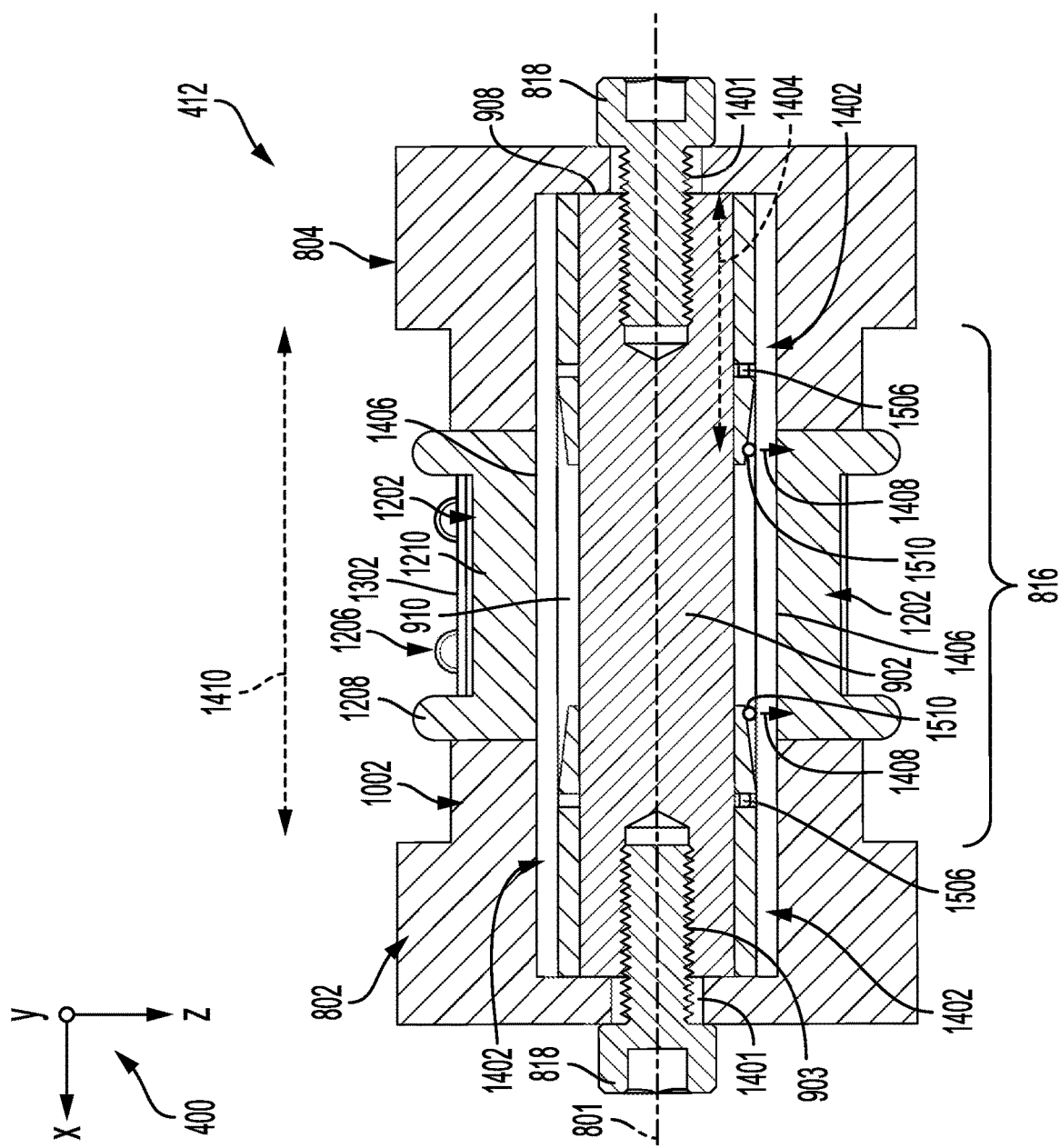
FIG. 14 shows a cross-section of the coupler of FIG. 8.
Figure 15:
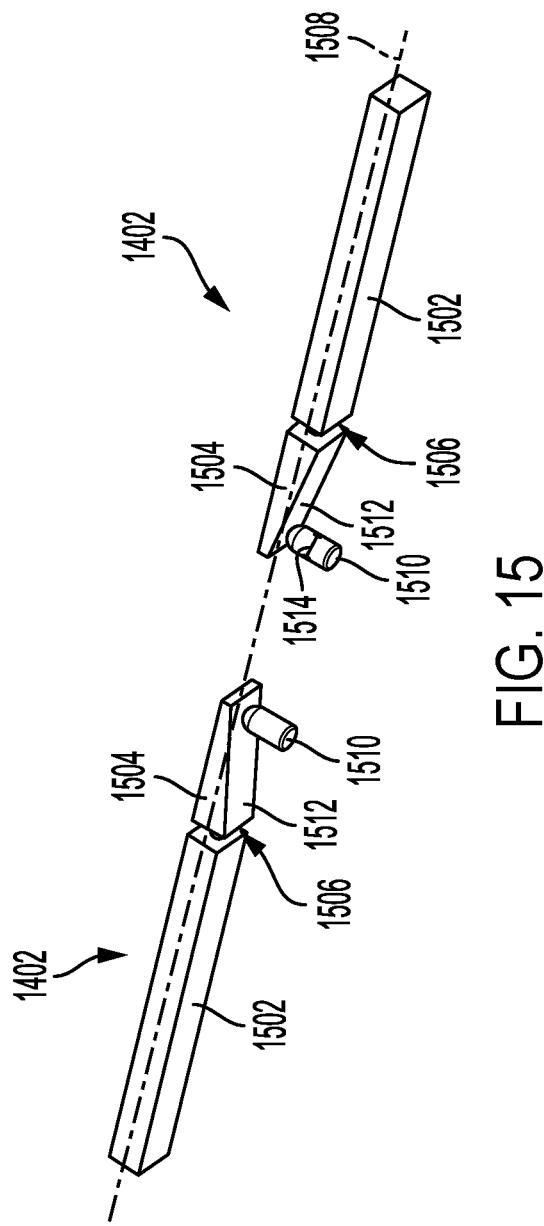
FIG. 15 shows examples of spring pushers of the coupler of FIG. 8.
Figure 16:
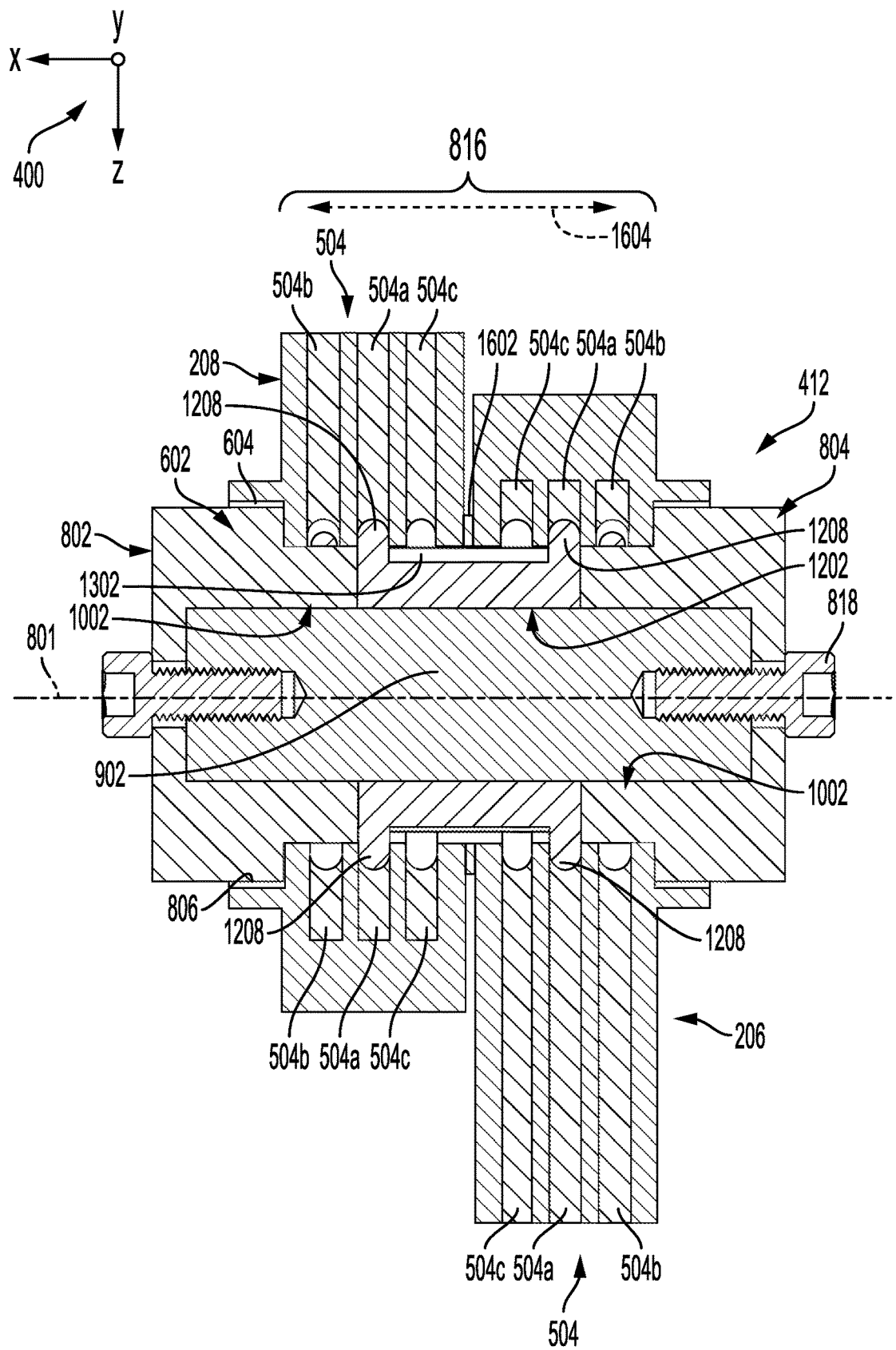
FIG. 16 shows a cross-section of the electrical harness of FIG. 4.
Figure 17:
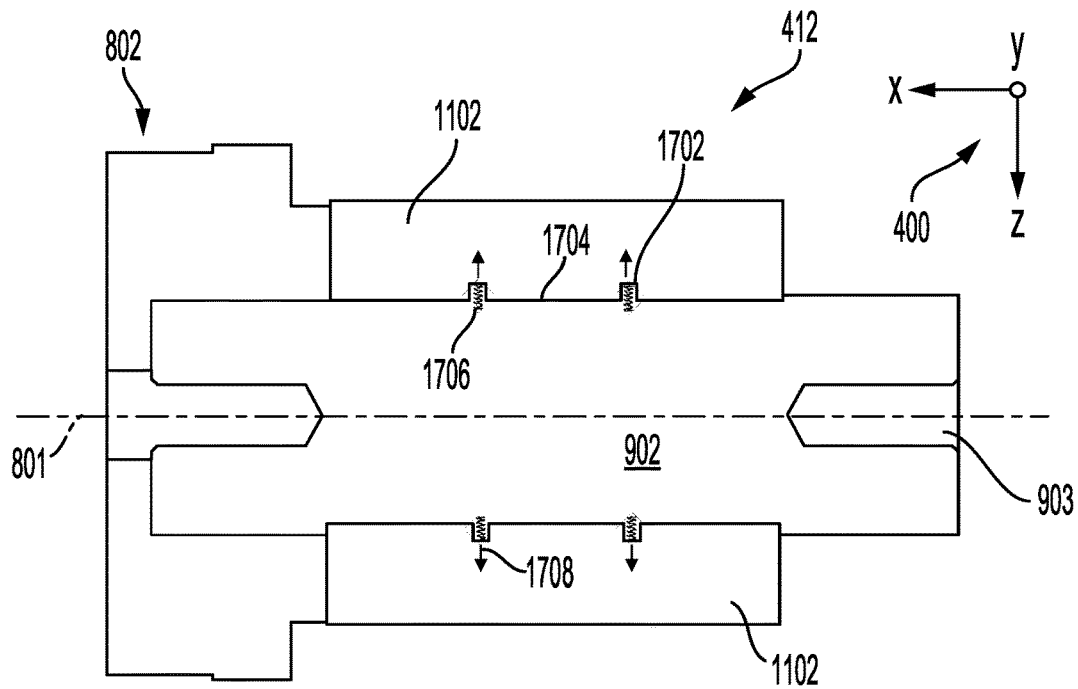
FIG. 17 shows a first cross-section of the journal of FIG. 11.
Figure 18:
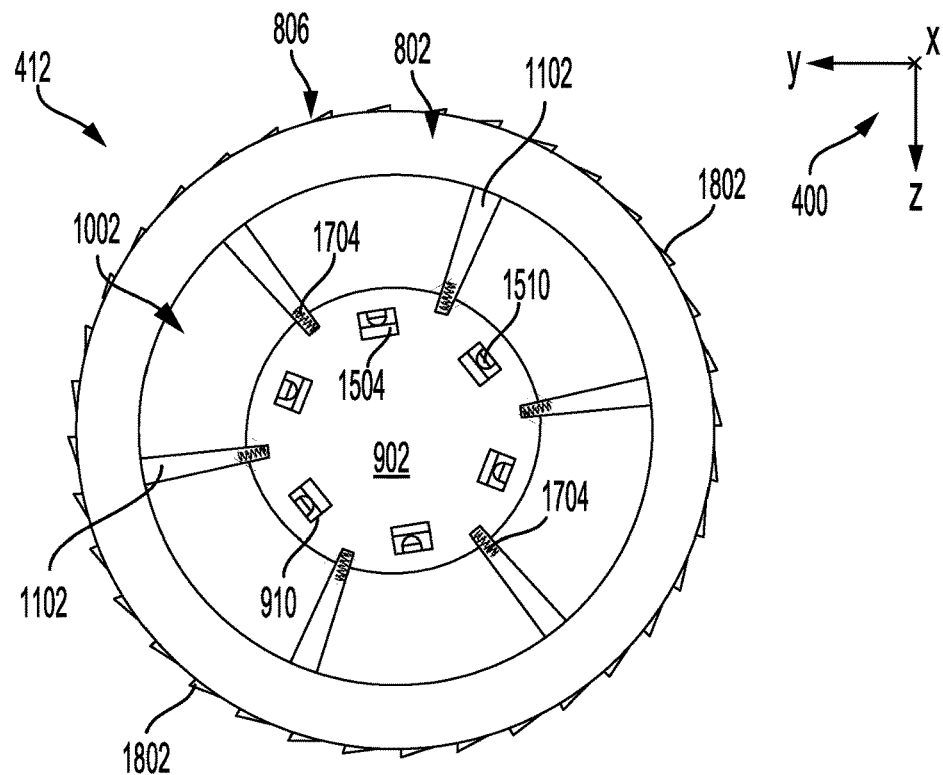
FIG. 18 shows a second cross-section of the journal of FIG. 11.

The following description relates to systems and methods for an electrical conduit. The electrical conduit may be used in a vehicle to transmit electrical energy between two electrical devices. The electrical conduit may include electrical harnesses where two sections of the electrical conduit may be connected and the electrical harnesses may be mounted to various regions of the vehicle, such as at a leaf spring, as shown in FIG. 1. An electrical harness with reduced parasitic losses relative to a conventional electrical connector is depicted in FIG. 2, coupled to the leaf spring. In one example, as shown in FIG. 3, the electrical conduit extending between two electrical devices with relative motion may be formed of a plurality of the electrical harness connected in series between the two devices. The electrical harness is shown in detail in FIG. 4, coupling two conductors to one another at terminal ends of the conductors. The conductors may be plate conductors, formed of a plurality of conductive plates arranged in parallel, each of the plates forming a phase of the electrical conduit. A first example of a plate conductor is depicted in FIGS. 5 and 6, from a perspective view and a cross-sectional view, respectively. A second example of the plate conductor, illustrating an alternate geometry, is shown in FIG. 7. The electrical harness may further include a coupler connecting the conductors. An example of the coupler is shown in FIGS. 8 and 14, from a perspective view and a cross-sectional view, respectively, and assembly of the coupler is depicted in FIGS. 9-13. Further cross-sectional views of the coupler are shown in FIGS. 17 and 18, illustrating various inner components of the coupler. The coupler may include spring pushers, as shown in FIG. 15 that engage phase bridges of the coupler. The phase bridges may be configured to maintain electrical continuity of each phase of the electrical conduit through the coupler, even when motion is induced in the electrical conduit due to relative motion between the end points of the electrical conduit. Contact between the phases of the conductors and the phase bridges of the coupler is illustrated in a cross-section of the electrical harness shown in FIG. 16.

FIGS. 1-18 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Conventional electrical harnesses may include end connectors coupled to cable ends, where the end connectors may be formed of a plastic housing. Various disadvantages may be associated with the conventional electrical harnesses, including high resistance which may result in heat generation. Exposure to heat may cause degradation of the plastic housing. Heat management at the electrical harnesses may include increasing a size of the electrical cables to absorb heat, leading to bulkier cables that occupy an undesirably large volume of space.

The cables may also present drawbacks with respect to electrical efficiency and a useful life of the electrical harnesses. For example, inductive coupling between the cables and electrically conductive materials, in close proximity to the cables, may drive energy losses. As well, bending and uncontrolled motion of the cables, resulting from coupling of components that move relative to one another, may lead to cable fatigue.

In one example, the issues above may be at least partially addressed by an electrical harness that connects conductors formed of parallel, electrically conductive plates, e.g., plate conductors, in place of conventional wire conductors. The plate conductors may be configured for high voltage applications and demonstrate lower resistance relative to wire conductors as a result of the parallel plate arrangement and by enabling effective thermal management via internal coolant passages. The plate conductors may be connected to one another by a coupler that allows rotation of the plate conductors with respect to one another. The coupler may maintain a phasing of the plate conductors via electric bridges to reduce inductive losses. Use of the plate conductors in conjunction with the coupler may provide an electrical harness with reduced random motion of the plate conductors, compared to high voltage cables, and increased electrical stability relative to conventional harnesses relying on plastic end connector housings.

A use-case example for an electrical harness with reduced random motion and increased electrical efficiency is illustrated in FIG. 1. A vehicle chassis 100 is shown in FIG. 1 with a leaf spring 102 coupled to the chassis 100. The leaf spring 102 may be used as a suspension for one or more wheels 104 of the vehicle. It will be noted that the one or more wheels 104 are omitted from one side of the chassis 100 for clarity. At a region 200, as indicated in FIG. 1 by a dashed ellipse, the leaf spring 102 may be coupled to the chassis 100 by a joint 106. The joint 106 may also be used as a mount for an electrical harness, as shown in FIG. 2.

The region 200 is depicted in greater detail in FIG. 2. Therein, an electrical harness 202 is coupled to the joint 106 by a bracket 204 such that the electrical harness 202 extends along a side of the joint 106 opposite of the chassis 100. Only a portion of a length of each of a first conductor 206 and a second conductor 208 of the electrical harness 202 are illustrated in FIG. 2 for brevity but it will be appreciated that the first and second conductors 206, 208 may extend across various distances alongside the chassis 100, e.g., substantially parallel with the chassis 100. The electrical harness 202 may be positioned as shown in FIG. 2 to couple, for example, an electrical modifier to an electrically consuming device.

As an example, as shown in FIG. 3, the electrical modifier may be an inverter 302 and the electrically consuming device may be a motor 304. The inverter 302 may, in one example, be attached to the chassis of the vehicle, e.g., the chassis 100 of FIGS. 1 and 2, and the motor 304 may be attached to an axle of the vehicle to supply torque to the axle. The inverter 302 and the motor 304 may be electrically coupled by an electrical conduit 306 formed of one or more of the electrical harness 202 connected in series.

A plurality of conductors 303 (where each of the plurality of conductors 303 are similar to the first conductor 206 and the second conductor 208 of FIG. 2) of the electrical conduit 306 may be rigid structures that do not bend. In other examples, however, at least one of the conductors of the electrical harnesses 202 may be a non-rigid conductor. As a result of a suspension system of the vehicle, the chassis of the vehicle may move relative to the axle through the leaf spring, e.g., the leaf spring 102 of FIGS. 1 and 2. As such, the inverter 302, which may be mounted to the chassis, may be subject to displacement relative to the motor 304. Thus, the electrical conduit 306 may be articulated to accommodate movement of the inverter 302 to provide current flow that is uninterrupted by displacement of the inverter 302, such as during bouncing of the chassis when the vehicle navigates uneven terrain.

Articulation of the electrical conduit 306 may be enabled by adapting the electrical harness 202 with a coupler that allows pivoting of the conductors about the coupler. For example, the electrical harness 202 is shown from a perspective view in FIG. 4. A set of reference axes 400 is provided for comparison between views shown, including an x-axis, a y-axis, and a z-axis. The first conductor 206 and the second conductor 208 may have similar widths 402 and thicknesses 404 but may have different lengths 406.

A first end 408 of the first conductor 206 may be coupled to a first end 410 of the second conductor 208 by a coupler 412, about which each of the first conductor 206 and the second conductor 208 may pivot, as indicated by arrow 414. As shown in FIG. 5, the first end 408 of the first conductor 206 (and the first end 410 of the second conductor 208) may have a curved edge 501 and may include an opening 502 through which the coupler 412 is inserted. The opening 502 may extend through the entire thickness 404 of the first conductor 206, as shown in FIG. 6 in a cross-section (taken along line A-A' of FIG. 5) of the first conductor 206. It will be appreciated that while only the first conductor 206 is depicted in FIGS. 5 and 6, the second conductor 208 may be similarly configured.

As illustrated in FIG. 5, the first conductor 206 may be formed of a plurality of plates 504 arranged parallel with the z-axis, and with one another, and enclosed within a housing 506. As such, the first conductor 206 (and the second conductor 208) may be referred to hereafter as plate conductors. The plurality of plates 504 may each have similar dimensions and may be spaced apart from one another, extending along the entire length 406 of the first conductor 206. As shown in FIG. 6, at the opening 502, surfaces of the plurality of plates 504 are exposed, forming a coupler receptacle 602 that allows the plurality of plates 504 to directly contact the coupler, as described further below. Furthermore, edges of the plurality of plates 504 at the coupler receptacle 602 may be recessed, forming circular tracks in the coupler receptacle 602. The circular tracks may be configured to receive conductive components of the coupler 412, described further below. The coupler receptacle 602 may include an external indexer 604 which may be a rim of splines configured to interface with an internal indexer of the coupler, as described below with reference to FIG. 8. The rim may encircle the opening 502 and may protrude outwards, away from the housing 506, along a side of the first conductor 206.

The plurality of plates 504 may be formed of a conductive material, such as copper, aluminum, silver, gold, etc. Each of the plurality of plates 504 may be a thin rectangular plate, e.g., with a thickness that is less than the thickness 404 of the first conductor 206. In one example, as shown in FIGS. 4-6, the first conductor 206 may be a three-phase conductor where the plurality of plates 504 includes three plates. However, other examples may include more or less of the plurality of plates 504, thereby varying the electrical phasing of the conductor.

By implementing the plurality of plates 504 as the conductive element of an electrical conduit (e.g., the electrical conduit 306 of FIG. 3) instead of wires, a manufacturing cost of the conductive element may be reduced. A resistance of the plurality plates 504 may be lower than a resistance of a wire conductor and connecting elements between electrical components and the plate conductors (e.g., the first and second conductors 206, 208) may also have lower resistances than connectors coupling cable conductors.

The housing 506 may entirely surround the plurality of plates 504 and seal the plurality of plates 504 within the housing 506 such that air or fluid outside of the housing 506 does not exchange with air or fluid inside of the housing 506. The housing 506 may be formed of a rigid dielectric material such as a composite, a polymer, etc. In some examples, the housing may be manufactured by low cost techniques such as additive manufacturing (e.g., 3-D printing), over molding, etc. Furthermore, such manufacturing methods may allow for internal coolant passages to be included in the housing 506.

The internal coolant passages (not shown in FIG. 5) may extend through the material of the housing between the plurality of plates 504 to allow a coolant, such as water, to flow in close proximity to surfaces of the plurality of plates 504, extracting heat from the plurality of plate 504 via convection. As an example, the internal coolant passages may be fluidically coupled to a coolant system of the vehicle used to facilitate heat exchange at, for example, a radiator of the vehicle. By cooling the plurality of plates 504, a temperature of the plurality of plates 504 may be maintained low when current is flowing through the plurality of plates 504 and driving heat generation. As a result of the cooling, less material may be used to form the plurality of plates 504, and both a resistance of the plurality of plates 504 and a loss of electrical power via heat production may be decreased.

The first conductor 206 may be further enclosed by a shield (not shown) to block electromagnetic interference from adjacent electrical components or conductors. For example, the shield may be a layer of copper, brass, nickel, silver, etc. In some instances, the shield may be molded or printed onto an outer surface of the housing 506. As another example, the shield may be configured as a woven sock wrapped around the housing 506.

The plate conductor may be formed with various geometries to conform to a target environment for the plate conductor. For example, while the first and second conductors 206, 208 of FIGS. 2 and 4-6 extend linearly along their lengths, other examples of the plate conductor may include one or more bends along the length of the plate conductor, as shown in FIGS. 3 and 7. Turning to FIG. 7, a cross-section (taken along the x-z plane) of an example of a non-linear, e.g., bent, plate conductor 700 is illustrated. The bent plate conductor 700 has a plurality of plates 702 extending along a length of the bent plate conductor 700, the plurality of plates 702 surrounded by a housing 704. The housing 704 may include internal coolant passages, as described above.

The bent plate conductor 700 has openings configured as coupler receptacles 706 at terminal ends of the bent plate conductor 700 where the coupler receptacles 706 are configured similar to the coupler receptacle 602 of FIGS. 5-6. The bent plate conductor 700 further includes a bend 708 at a mid-point along a length of the bent plate conductor 700. In other examples, however, the bent plate conductor 700 may include more than one bend or the bend 708 may be biased towards one end of the bent plate conductor 700. A geometry of the plate conductor may therefore conform to a desired overall configuration of the electrical conduit without causing material fatigue.

Articulation of the electrical conduit may be enabled by a coupling configuration of the coupler 412 with the plate conductors of the electrical harness 202. The coupler 412 is shown independent of the plate conductors in FIG. 8 and may have a cylindrical geometry with a first end cap 802 and a second end cap 804 arranged at opposite ends of the coupler 412. A central axis of rotation 801 of the coupler 412 is aligned parallel with the x-axis in FIGS. 8-13. The end caps may be formed of a non-conductive material similar to the housing of the plate conductors, such as a polymer, a resin, etc. Each of the first end cap 802 and the second end cap 804 may include internal indexers 806 which may be a plurality of splines arranged around a circumference of each of the first end cap 802 and the second end cap 804. The internal indexers 806 may extend from an inside edge 808 of each end cap to a mid-point between the inside edge 808 and an outside edge 810 of each end cap.

A profile of one of the internal indexers 806 is shown in FIG. 18. Individual tabs 1802 of the internal indexer are biased to allow indexing in one direction. For example, a tapering of the tabs 1802 may include an increase in an outwards protrusion of the tabs 1802 at a right-most end of each of the tabs, according to the view shown in FIG. 18. When an external indexer, such as the external indexer 604 of FIGS. 5-6, is engaged with the internal indexer 806, the external indexer may rotate clockwise but not counter-clockwise relative to the first end cap 802. The unidirectional motion directed by the internal indexers 806 allows motion of bridge insulator scrappers and phase bridges of the coupler 412 (described further below) to wear evenly against the plurality of plates 504 of the plate conductors which reduces electrical erosion between the phase bridges and the plurality of plates 504. It will be appreciated that in other examples, the internal indexers 806 may be configured to allow rotation in the counter-clockwise direction (with respect to the view of FIG. 18) instead.

When the coupler 412 is inserted into the coupler receptacle of the plate conductor (e.g., the coupler receptacle 602 of FIGS. 5-6), the internal indexers 806 of one of the end caps may interface with the external indexer of the coupler receptacle (e.g., the external indexer 604 of FIGS. 5-6). Engagement of the internal indexer with the external indexer includes a click-fit interaction, where rotation of the external indexer occurs through set positions where splines of the indexers mesh, e.g., interlock. The meshing of the splines maintains the indexers in a first position until sufficient force is applied to drive rotation of one of the internal or external indexers to overcome interference provided by the abutting of the splines. The indexers then click into a second position where the splines again mesh.

Figure 9:
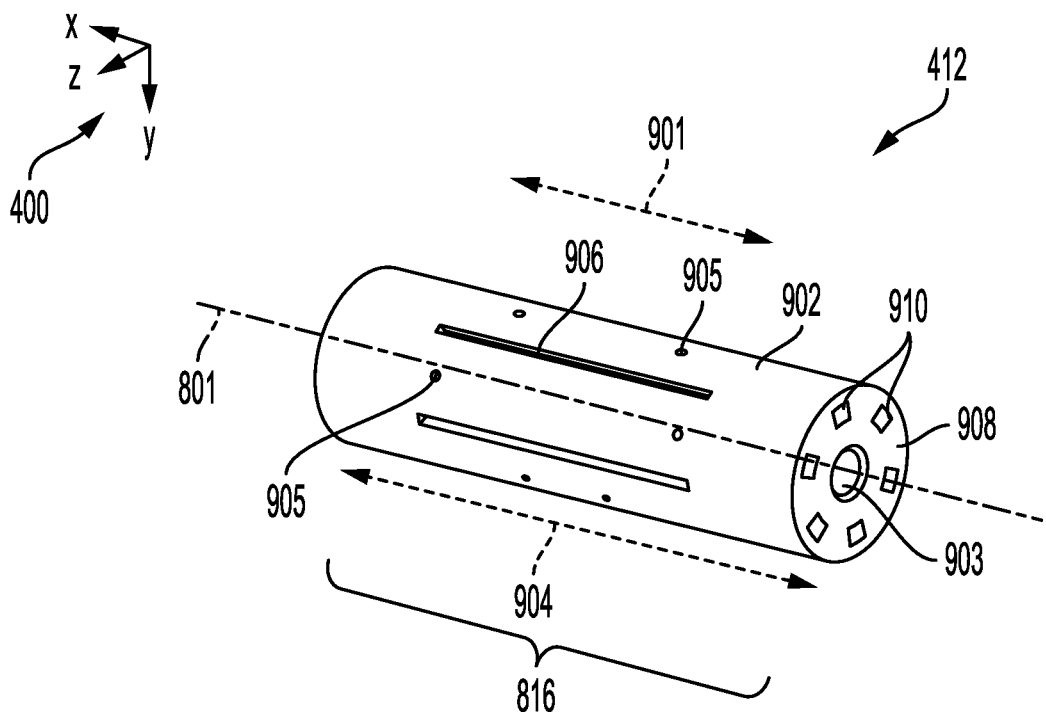
FIG. 9 shows an example of a journal of the coupler of FIG. 8.

The first and second end caps 802, 804 may be similarly sized and shaped as one another and may have a larger diameter 812 than a diameter 814 of a central portion 816 of the coupler 412. The central portion 816 may include a journal (e.g., a journal 902 as shown in FIG. 9) that is a separate unit from the end caps and may support electrically conductive components. The first and second end caps 802, 804 may each be coupled to the journal of the central portion 816 by a clamp bolt 818 which may be inserted into the coupler 412 such that a length of the clamp bolt is centered about and aligned with the central axis of rotation 801 of the coupler 412. Tightening of the clamp bolts 818 couples the first and second end caps 802, 804 to the journal such that the end caps do not rotate relative to the journal.

Assembly of the coupler 412 is shown in FIGS. 9-13, sequentially, with FIG. 8 depicting the fully assembled coupler 412. Turning first to FIG. 9, the central portion 816 of the coupler 412 includes the journal 902 which may be a rod with a uniform diameter, e.g., the diameter 814 of FIG. 8, along a length 904 of the journal 902. The journal 902 may be formed of a similar material as the end caps, e.g., a non-conductive material. The journal 902 may include a plurality of slots 906 extending along a portion of the length 904 of the journal 902 and spaced apart evenly around a circumference of the journal 902. Each of the plurality of slots 906 may have similar dimensions and form a linear groove in a surface of the journal 902. A length 901 of each of the plurality of slots 906 may be shorter than the length 904 of the journal 902 and the plurality of slots 906 may be centered along the length 904 of the journal 902.

End surfaces 908 of the journal 902 may include openings 903 aligned with the central axis of rotation 801 as well as internal channels 910 spaced evenly apart around the central axis of rotation 801 and extending entirely along the length 904 of the journal 902. The channels 910 may be configured to receive spring pushers, as depicted in FIGS. 14 and 15 and described further below, to exert a constant force on phase bridges positioned around the circumference of the journal 902. The force causes the phase bridges to exert a constant and consistent pressure on plate conductors interfacing with the phase bridges, thereby compensating for wear and maintaining contact between the phase bridges and the plate conductors during vibration and shock loads. The spring pushers may have pins that lock into holes 905 in the surface of the journal 902, at locations around the circumference of the journal 902 that correspond to the pins of the spring pushers.

Figure 10:
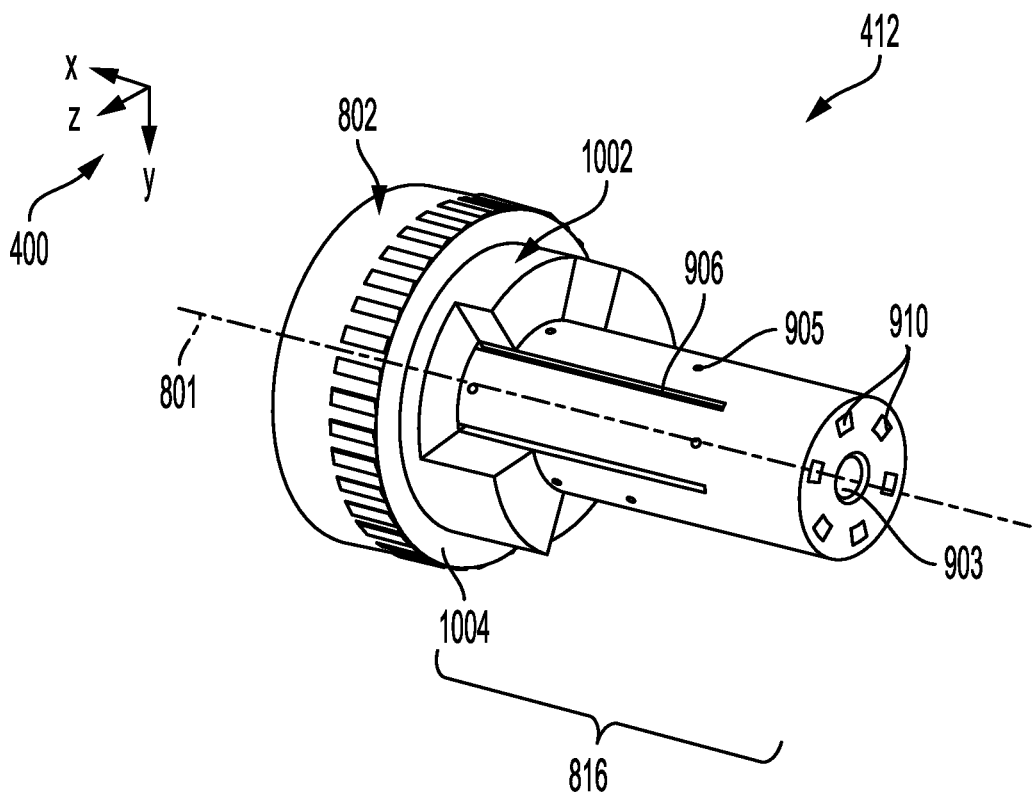
FIG. 10 shows a coupling of an end cap to the journal of FIG. 9.

The openings 903 extending along the central axis of rotation 801 from the end surfaces 908 may, in one example, have threaded surfaces configured to receive the clamp bolts 818 (as shown in FIG. 8) to secure the end caps to the end surfaces 908 of the journal 902. For example, as shown in FIG. 10, the first end cap 802 may be coupled to one end of the journal 902 such that both the first end cap 802 and the journal 902 are aligned along the central axis of rotation 801 and directly in contact with one another. The first end cap 802 may include a collar 1002, which is included in the central portion 816, attached to and protruding from an inner face 1004 of the first end cap 802.

The collar 1002 may have an irregular, e.g., asymmetric, geometry with sections that protrude away from the inner face 1004 of the first end cap 802 at different distances along the central axis of rotation 801. The different protrusions of the sections may be configured to accommodate a positioning of differently sized electronic components located in the central portion 816 of the coupler 412. Furthermore, the protrusions of the sections may be arranged such that the sections do not overlap with, e.g., block, the plurality of slots 906 of the journal 902.

Figure 11:
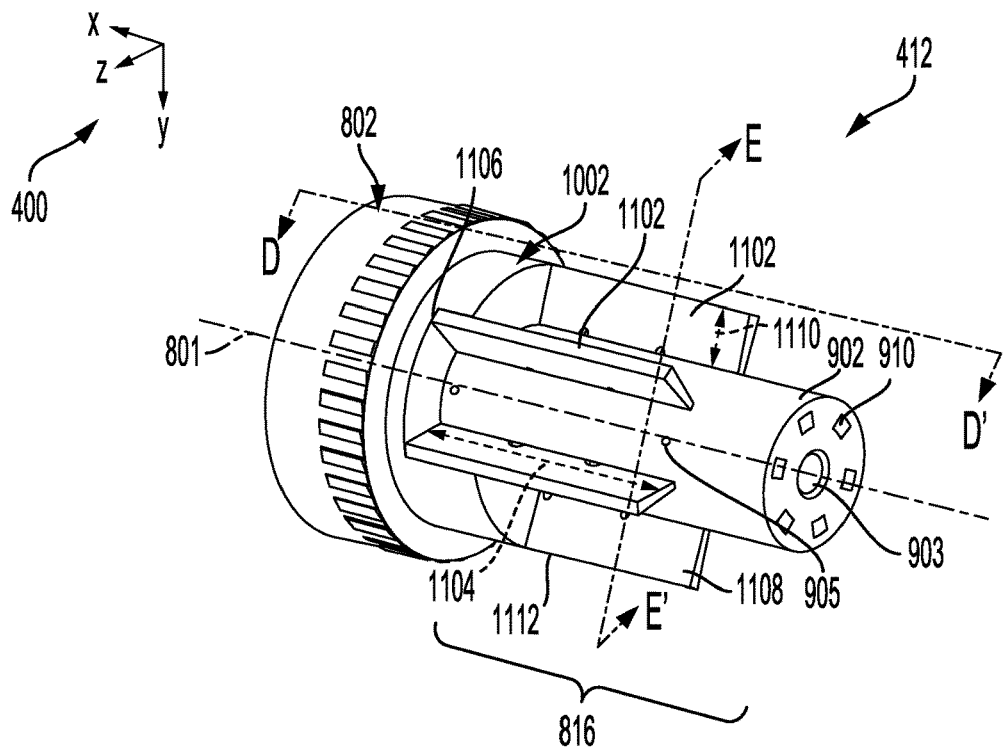
FIG. 11 shows a coupling of electrically insulating plates to the journal of FIG. 9.

As shown in FIG. 11, a first set of insulating plates 1102, hereafter, bridge insulator scrappers 1102, may be inserted into each of the plurality of slots 906 of the journal 902. The bridge insulator scrappers 1102 may be rectangular plates formed of an electrically insulating material, such as PVC, resin, rubber, etc. A length 1104 of each of the bridge insulator scrappers 1102 may be similar to lengths of the plurality of slots 906 and may abut the collar 1002 of the first end cap 802 at a first end 1106 of each of the bridge insulator scrappers 1102. The bridge insulator scrappers 1102 may abut a collar of the second end cap 804 of the coupler 412 at a second end 1108 of each of the bridge insulator scrappers 1102, as shown in FIG. 8, where the collar of the second end cap 804 is a mirror image of the collar 1002 of the first end cap 802 across the y-z plane.

The bridge insulator scrappers 1102 protrude outwards, away from the central axis of rotation 801 along a width 1110 of the bridge insulator scrappers 1102. The width 1110 of the bridge insulator scrappers 1102 may be similar to a difference between the diameter 814 of the journal 902 and the diameter 812 of the end caps, as indicated in FIG. 8. An outer edge 1112 of each of the bridge insulator scrappers 1102 may therefore be even with an outer surface of the collar 1002 of the first end cap 802 (and the collar of the second end cap 804) along the central axis of rotation 801. The bridge insulator scrappers 1102 may be maintained in place by pressing an inner side of each of the bridge insulator scrappers 1102 into one of the plurality of slots 906 of the journal 902. A thickness of the bridge insulator scrappers 1102 may be selected such that the bridge insulator scrappers 1102 slide when inserted into the plurality of slots 906 (as shown in FIGS. 9 and 10). In addition, bridge insulator scrappers may be configured with notches 1702 to accommodate springs, as shown in FIGS. 17 and 18.

In some examples, as shown in FIG. 11, the thickness of the bridge insulator scrappers 1102 may not be uniform. For example, the thickness of the bridge insulator scrappers 1102 may taper, being thickest at the outer edge 1112 and decreasing in a direction towards the central axis of rotation 801. The tapered thickness of the bridge insulator scrappers 1102 allows the bridge insulator scrappers to fit snugly between the phase bridges of the coupler 412. However, in other examples, the thickness of the bridge insulator scrappers 1102 may be uniform.

A first cross-section of the coupler 412, taken along line D-D' of FIG. 11 is illustrated in FIG. 17 and a second cross-section of the coupler 412, taken along line E-E' of FIG. 11 is illustrated in FIG. 18. The bridge insulator scrappers 1102 include notches 1702 along an inner edge 1704 of the bridge insulator scrappers 1102, e.g., along an edge inserted into the plurality of slots 906 as shown in FIGS. 9 and 10. The notches 1702 may be configured to receive springs 1706 which, when assembled into the plurality of slots 906, may exert an outward radial force on the bridge insulator scrappers 1102, as indicated by arrows 1708. As a result, the bridge insulator scrappers 1102 may be spring-loaded and compelled to slide, e.g., rub, against inner surfaces of the coupler receptacle of the plate conductor (e.g., the coupler receptacle 602 of FIGS. 5 and 6 and 706 of FIG. 7). In other words, the outer edge 1112 of the bridge insulator scrappers 1102 may be in constant contact with the inner surfaces of the coupler receptacle. The constant contact may block entry of metallic particles, such as copper dust into the coupler receptacle, which may be formed during movement of phase bridges relative to the plurality of plates of the plate conductors.

The bridge insulator scrappers 1102 may be arranged as shown in FIG. 11 to insulate various phase bridges from one another. The phase bridges may be coupled to the outer surface of the journal 902, as shown in FIG. 12, and includes a first phase bridge 1202, a second phase bridge 1204, and a third phase bridge 1206. It will be noted that the coupler 412 may include more than one of each of the phase bridges. The phase bridges may float radially between the journal 902 and a plurality of plates of a plate conductor (e.g., the plurality of plates 504 of the first conductor 206 of FIGS. 5 and 6) and positioned of the phase bridges along the circumference of the journal 902 maintained in place due to a combination of the journal 902, the bridge insulator scrappers 1102, and the collars 1002 of the end caps. Spring pushers, described further below, may apply a force to a deck 1210 of each of the phase bridges which may maintain contact between the deck 1210 and the plurality of plates of the plate conductor. Rotation of the phase bridges is inhibited by the bridge insulator scrappers 1102 and constrained along the central axis of rotation 801 by the collars 1002 and the end caps (e.g., the first and second end caps 802, 804) of the coupler 412.

The phase bridges may be formed of an electrically conductive material, such as copper, aluminum, silver, gold, etc., and each phase bridge may correspond to a phase of the plate conductors. Furthermore, each phase bridge has a pair of abutments 1208 coupled to opposite ends of the deck 1210. The deck 1210 may be planar with a rectangular outer shape and may be arranged in face-sharing contact with the outer surface of the journal 902. Each of the abutments 1208 of the phase bridges may abut one of the collar of the first end cap 802 and the collar of the second end cap 804 and may be aligned with one of the holes 905 of the journal 902 (as shown in FIGS. 9-11). As such, each abutment is positioned directly over one of the holes 905. The abutments 1208 may also be planar structures that are continuous with the deck 1210 but protrude outwards and away from the central axis of rotation 801, perpendicular to a plane of the deck 1210. Both an inner edge 1212 and an outer edge 1214 of each of the abutments 1208 may be curved to match a curvature of the outer surface of the journal 902, e.g., curved along the circumference of the journal 902. The outer edge 1214 is also curved along the central axis of rotation 801. The abutments 1208 may protrude outwards and away from the central axis of rotation 801 by a distance that is greater than the outward protrusion of the bridge insulator scrappers 1102. An extra protrusion of the abutments 1208 allows the outer edge 1214 of the each of the abutments 1208 to interface with the circular tracks of the coupler receptacle 602 of each plate conductor, as shown in FIG. 6.

The outer edge 1214 of the abutments 1208 may have an arc spanning an angle $\alpha$. In one example, the angle $\alpha$ may be 60 degrees. In other examples, however, the angle $\alpha$ may vary according to a number of each of the phase bridges included in the coupler 412 as well as a number of phases of the plate conductor and the coupler 412. Regardless of a radial span of the outer edge 1214, a surface area of the outer edge 1214 of the abutments 1208 that contacts a plate of the plurality of plates of the plate conductor is configured to be greater than a cross-sectional area of the plate. A quantity of each of the first, second, and third phase bridges 1202, 1204, 1206 may be varied depending on anticipated external environmental factors, such as vibration, relative rotational speeds between two plate conductors coupled to the coupler 412, and packaging space. Increasing a quantity of each of the phase bridges may increase an amount of contact between each of the phase bridges and a corresponding plate of the plate conductor at the coupler receptacle.

The first phase bridge 1202 may have a first length 1216 oriented parallel with the central axis of rotation 801. The first phase bridge 1202 may be centered along the length 904 (as shown in FIG. 9) of the journal 902. The second phase bridge 1204 may be similarly aligned, with a second length 1218 of the second phase bridge 1204 oriented parallel with the central axis of rotation 801, and positioned adjacent to the first phase bridge 1202 around the circumference of the journal 902. However, the second phase bridge 1204 is separated from, e.g., spaced away and not in contact with, the first phase bridge 1202 by one of the bridge insulator scrappers 1102, placed therebetween.

The second length 1218 of the second phase bridge 1204 may be greater than the first length 1216 of the first phase bridge 1202 and may be similar to the length 901 of the plurality of slots 906, as indicated in FIG. 9. The third phase bridge 1206 may be positioned adjacent to the second phase bridge 1204, opposite of the first phase bridge 1202, with a third length 1220 of the third phase bridge 1206 oriented parallel with the central axis of rotation 801 and centered along the length 904 of the journal 902. The third phase bridge 1206 is separated from the second phase bridge 1204 by one of the bridge insulator scrappers 1102. The third length 1220 of the third phase bridge 1206 may be shorter than either of the first length 1216 of the first phase bridge 1202 and the second length 1218 of the second phase bridge 1204.

The first, second, and third phase bridges 1202, 1204, 1206, and bridge insulator scrappers 1102 arranged in between, may be repeated around the circumference of the journal 902. As such, the outer surface of the journal 902 may be entirely surrounded by the phase bridges and the bridge insulator scrappers 1102. By positioning the bridge insulator scrappers 1102 between each of the phase bridges, the phase bridges are electrically insulated from one another.

Each of the phase bridges may abut sections of the collar 1002 of the first end cap 802 (and of the collar of the second end cap 804) with suitable protrusions along the central axis of rotation 801 to accommodate the length of the phase bridge. For example, the third phase bridge 1206 may be positioned between sections of the collars of the end caps that protrude further along the central axis of rotation 801 than sections of the collars that the second phase bridge 1204 abuts.

A second set of insulating plates 1302, hereafter, bridge insulators 1302, may be coupled to the decks 1210 of each of the phase bridges. The bridge insulators 1302 may be formed of an electrically insulating material, which may be the same material as the material from which the bridge insulator scrappers 1102 are formed. Dimensions of the bridge insulators 1302 may be selected to match one of the decks 1210 of the phase bridges such that the bridge insulators 1302 may be positioned directly over and in face-sharing contact with one of the decks 1210 and arranged between the abutments 1208 of the phase bridge and between two of the bridge insulator scrappers 1102 arranged on opposite sides of the deck. The bridge insulators 1302 are not fixedly coupled to the decks 1210 of the phase bridges, thereby allowing the bridge insulators to move radially. The radial movement of the bridge insulators 1302 allows the floating phase bridges to maintain contain with the plurality of plates of the plate conductors as compelled by pressure exerted on the phase bridges by the spring pushers. Outer surfaces of the bridge insulators 1302 may include a coating of, for example, an adhesive to capture any debris formed during rubbing of the bridge insulator scrappers 1102 against the plurality of plates of the plate conductors (e.g., within the coupler receptacles).

Positioning the bridge insulators 1302 over the decks 1210 of the phase bridges provides an insulating barrier between the decks 1210 and external, conductive objects and components. Thus the abutments 1208 of the phase bridges may exclusively provide points of contact with conductive components of the coupler 412. Complete assembly of the coupler 412 includes attaching the second end cap 804 to the journal 902, opposite of the first end cap 802, as shown in FIG. 8. The first and second end caps 802, 804 may be coupled to the journal by the clamp bolts 818, as described above and shown in FIG. 14 in a cross-section of the coupler 412. The cross-section is taken along line B-B' of FIG. 8.

As depicted in FIG. 14, the clamp bolts 818 securing the first and second end caps 802, 804 to the journal 902 may be inserted through through-holes 1401 in the end caps and into the openings 903 in the journal 902 to engage with threading in the openings 903. As described above, spring pushers 1402 may be inserted into the channels 910 extending through the journal 902. The spring pushers 1402 are shown in greater detail in FIG. 15.

As illustrated in FIG. 15, the spring pushers 1402 may include a push-rod 1502 and a wedge 1504 coupled to the push-rod 1502 by a spring 1506. The push-rod 1502 and the wedge 1504 may be aligned along a longitudinal axis 1508 and spaced apart by the spring 1506. The push-rod 1502 and the wedge 1504 may both be formed of a rigid material, such as a metal. The spring 1506 may allow relative motion between the push-rod 1502 and the wedge 1504.

A pin 1510 is coupled to the wedge 1504, at a narrow end of the wedge 1504, and may protrude away from a slanted facet 1512 of the wedge 1504, perpendicular to the longitudinal axis 1508. Unlike the wedge 1504, the pin 1510 may be formed of an insulating material. Furthermore, the insulating material may be configured with to induce minimal friction when in contact with the phase bridges. The pin 1510 may be configured with a diameter 1514 that is similar to a diameter of the holes 905 of the journal 902, as shown in FIGS. 9-11, allowing the pin 1510 to be inserted through one of the holes 905. As such, the spring pushers 1402 may be inserted into the channels 910 of the journal 902 (e.g., as shown in FIG. 9) with the pin 1510 of each of the spring pushers 1402 extending outwards and away from the central axis of rotation 801, as illustrated in FIG. 18.

As depicted in FIG. 14, a length of the spring pushers 1402, as defined along the longitudinal axis 1508 of FIG. 15, may be configured to match a distance 1404 between the end surface 908 of the journal 902 and one of the holes 905 of the journal 902. As such, the length of the spring pusher 1402 may vary depending on which of the holes 905 the spring pusher 1402 is configured to engage with, where engagement includes insertion of the pin 1510 of the spring pusher 1402 through one of the holes 905 of the journal 902. For example, a spring pusher corresponding to a hole positioned under the abutment 1208 of the first phase bridge 1202 may be shorter than a spring pusher configured to correspond to a hole positioned under the abutment of the third phase bridge 1206.

When the spring pushers 1402 are inserted through the channels 910 of the journal 902 such that the pin 1510 locks into the corresponding hole 905 of the journal 902, at least a portion of the pin 1510 may protrude outwards from the outer surface of the journal 902. The pin 1510 may thereby push against an inner surface 1406 of one of the phase bridges, exerting a force as indicated in FIG. 14 by arrows 1408. The force exerted by the pin 1510 may maintain contact between the corresponding phase bridge and one plate of the plurality of plates of the plate conductors.

The plate conductors may be coupled to the coupler 412 such that the coupler 412 is inserted through the coupler receptacle of each plate conductor. The coupler 412 is therefore circumferentially surrounded by two of the plate conductors with each plate conductor surrounding half of a length 1410 of the central portion 816 of the coupler 412. For example, turning to FIG. 16, a cross-section taken along line C-C' of FIG. 4 is shown. The first conductor 206 and the second conductor 208 are connected to the coupler 412 so that lengths of the conductors are parallel with the diameter of the coupler 412, e.g., along the z-axis, and widths of the conductors are parallel with the length of the coupler 412, e.g., along the x-axis. The first conductor 206 is positioned adjacent to the second conductor 208 within the central portion 816 of the coupler 412 and a washer 1602 may be sandwiched between the conductors.

As described above, the external indexer 604 of the coupler receptacle 602 of each of the plate conductors may interface with one of the internal indexers 806 of the coupler 412 to allow unidirectional motion of the plate conductors with respect to the coupler 412. The plate conductors may rotate about the coupler 412 through the y-z plane while maintaining contact with the coupler 412. More specifically, the plurality of plates 504 of each plate conductor maintain contact with the phase bridges of the coupler 412 regardless of relative positions of the plate conductors.

For example, a first plate 504a of the plurality of plates 504 of each of the first conductor 206 and the second conductor 208 may be a middle plate of each plate conductor that is aligned with the abutments 1208 of the first phase bridge 1202. Thus the first plate 504a of each plate conductor is in direct contact with a pair of the first phase bridges 1202, arranged on opposite sides of the coupler 412, regardless of the position of the plate conductors with respect to the coupler 412.

A configuration of the first phase bridge 1202 allows the first plate 504a of each plate conductor to be in contact with the first phase bridge 1202 but not a second plate 504b or a third plate 504c of the plurality of plates 504. For example, the first length 1216 (as shown in FIG. 12) of the first phase bridge 1202 may be narrower than a distance 1604 between the second plate 504b of the first conductor 206 and the second plate 504b of the second conductor 208. The third plate 504c of the first conductor 206 and the third plate 504c of the second conductor 208 are each aligned with the bridge insulator 1302 of the first phase bridge 1202 but spaced away from the bridge insulator 1302 by a gap. The first phase bridge 1202 is thus an electrical bridge between the first plate 504a of the first conductor 206 and the first plate 504a of the second conductor 208. Electrical continuity of the electrical phase formed by the first plate 504a of the plate conductors is thereby maintained across the coupler 412. The second phase bridge 1204 (e.g., as shown in FIGS. 8, 12, and 13) enables electrical continuity along the second plate 504b of the plate conductors across the coupler 412 and the third phase bridge 1206 (e.g., as shown in FIGS. 8, 12, and 13) enables electrical continuity along the third plate 504c of the plate conductors across the coupler 412. The bridge insulators 1302 and the bridge insulator scrappers 1102 (e.g., as shown in FIGS. 8, and 11-13) provide electrical insulating between the phases of the electrical conduit.

In this way, parasitic losses at an electrical conduit may be reduced. The electrical conduit may include plate conductors formed of one or more conductive plates arranged in parallel along a length of the plate conductors. The parallel conductive plates may be electrically insulated from one another by a housing, formed of a non-conductive material, that encloses and separates the plates. The parallel arrangement of the plates, which may have a lower resistance than a conventional wire conductor, may minimize inductive losses by enabling cumulative cancellation of magnetic fields generated at each of the plates. The resistance of the plate conductors may be further reduced by configuring the housing with coolant channels to allow a coolant to flow through the plate conductor, thereby extracting heat from the plates. For applications where electrical energy transmission between two end points where at least one of the end points is in motion relative to the other, the electrical conduit may include at least one electrical harness with a coupler. The coupler may connect terminal ends of sections of the electrical conduit formed by the plate conductors. The terminal ends of the plate conductors may include coupler receptacles configured to receive the coupler and maintain both electrical continuity of each phase of the electrical conduit as well as electrical insulation between the phases. The coupler may allow pivoting of the plate conductors about the coupler, thereby accommodating changes in relative positioning between the end points of the electrical conduit due to motion occurring at one or more of the end points. A rigidity of the plate conductors, however, circumvents random motion of the electrical conduit, such as whipping or flaying, thereby decreasing degradation of the electrical conduit due to fatigue. Furthermore, the coupler may demonstrate lower resistance and electrical erosion than conventional electrical connectors used in electrical conduits.

The disclosure also provides support for an electrical harness, comprising: a first conductor coupled to a second conductor by a coupler, each of the first and the second conductors formed of plates arranged in parallel along a length of the first and the second conductors, and wherein the coupler includes electrical bridges of varying dimensions to maintain electrical continuity between the first conductor and the second conductor through the coupler. In a first example of the system, the first conductor and the second conductor are coupled to the coupler at terminal ends of the each of the first conductor and the second conductor and wherein the first conductor and second conductor are configured to rotate about the coupler. In a second example of the system, optionally including the first example, the plates of each of the first conductor and the second conductor are surrounded by and sealed within a rigid housing formed of a non-conductive material and each of the plates is an electrical phase of the electrical harness. In a third example of the system, optionally including one or both of the first and second examples, the housing has internal coolant passages configured to flow a coolant to extract heat from the plates. In a fourth example of the system, optionally including one or more or each of the first through third examples, each of the electrical bridges is configured to contact one plate of each of the first conductor and the second conductor and allow current to flow between the plate of the first conductor and the plate of the second conductor. In a fifth example of the system, optionally including one or more or each of the first through fourth examples, the coupler is formed of a journal extending between end caps, the end caps coupled to opposite ends of the journal, and the electrical bridges are coupled to a surface of the journal around a circumference of the journal between the end caps. In a sixth example of the system, optionally including one or more or each of the first through fifth examples, the coupler is inserted through an opening at an end of the first conductor and an opening at an end of the second conductor, the first conductor and the second conductor arranged adjacent to one another along a central axis of rotation of the coupler and wherein the first conductor and the second conductor circumferentially surround the coupler between the end caps. In a seventh example of the system, optionally including one or more or each of the first through sixth examples, the opening of each of the first conductor and the second conductor includes a set of indexing splines configured to interface with indexing splines of each of the end caps of the coupler. In an eighth example of the system, optionally including one or more or each of the first through seventh examples, the first conductor and the second conductor are configured to pivot about the coupler.

The disclosure also provides support for an electrical conduit, comprising: one or more conductors formed of parallel conductive plates enclosed in a non-conductive housing, the non-conductive housing including internal coolant passages to flow a coolant alongside the parallel conductive plates. In a first example of the system, the parallel conductive plates extend along a length of each of the one or more conductors and wherein each of the parallel conductive plates are electrically insulated from adjacent parallel conductive plates by a material of the housing. In a second example of the system, optionally including the first example, the internal coolant passages are formed within the material of the housing, between the parallel conductive plates. In a third example of the system, optionally including one or both of the first and second examples, the one or more conductors are connected in series by a coupler configured to enable rotational motion of the one or more conductors around the coupler. In a fourth example of the system, optionally including one or more or each of the first through third examples, each of the one or more conductors includes a coupler receptacle formed of an opening with a rim protruding outwards and away from the opening, the rim configured with indexing splines along an inner surface of the rim. In a fifth example of the system, optionally including one or more or each of the first through fourth examples, the one or more conductors have a linear or bent geometry and wherein the one or more conductors with the bent geometry includes one or more bends along a length of the one or more conductors.

The disclosure also provides support for a coupler for an electrical harness, comprising: a journal supporting electrical bridges of different lengths, the electrical bridges arranged around a circumference of the journal and separated by a first set of insulating plates, end caps coupled to opposite ends of the journal, the end caps including indexing splines configured to interface with indexing splines of plate conductors rotatably coupled to the coupler. In a first example of the system, each of the end caps includes a collar protruding from an inner side of the end caps, the collar including sections extending to different points along a length of the journal. In a second example of the system, optionally including the first example, the first set of insulating plates protrude outward, away from the journal and extend along a length of the journal between the collar of each of the end caps and wherein the first set of insulating plates are inserted into slots in an outer surface of the journal. In a third example of the system, optionally including one or both of the first and second examples, the system further comprises: a second set of insulating plates coupled to a deck of each of the electrical bridges. In a fourth example of the system, optionally including one or more or each of the first through third examples, the system further comprises: a set of spring pushers inserted into internal channels of the journal extending from one end of the journal to a mid-point along a length of the journal, the spring pushers including a pin configured to protrude outwards, away from a central axis of rotation of the journal, through a hole in the journal.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electrical harness, comprising:
a first conductor coupled to a second conductor by a coupler, each of the first and the second conductors formed of plates arranged in parallel along a length of the first and the second conductors, wherein the coupler includes electrical bridges of varying dimensions to maintain electrical continuity between the first conductor and the second conductor through the coupler, wherein the coupler is formed of a journal extending between end caps, the end caps coupled to opposite ends of the journal, and the electrical bridges are coupled to a surface of the journal around a circumference of the journal between the end caps, wherein the coupler is inserted through an opening at an end of the first conductor and an opening at an end of the second conductor, the first conductor and the second conductor arranged adjacent to one another along a central axis of rotation of the coupler, and wherein the first conductor and the second conductor circumferentially surround the coupler between the end caps.

2. The electrical harness of claim 1, wherein the plates of each of the first conductor and the second conductor are surrounded by and sealed within a rigid housing formed of a non-conductive material and each of the plates is an electrical phase of the electrical harness.

3. The electrical harness of claim 2, wherein the housing has internal coolant passages configured to flow a coolant to extract heat from the plates.

4. The electrical harness of claim 1, wherein each of the electrical bridges is configured to contact one plate of each of the first conductor and the second conductor and allow current to flow between the plate of the first conductor and the plate of the second conductor.

5. The electrical harness of claim 1, wherein the opening of each of the first conductor and the second conductor includes a set of indexing splines configured to interface with indexing splines of each of the end caps of the coupler.

6. An electrical conduit, comprising:
one or more conductors formed of parallel conductive plates enclosed in a non-conductive housing, the non-conductive housing including internal coolant passages to flow a coolant alongside the parallel conductive plates, wherein each of the one or more conductors includes a coupler receptacle formed of an opening with a rim protruding outwards and away from the opening, the rim configured with indexing splines along an inner surface of the rim.

7. The electrical conduit of claim 6, wherein the parallel conductive plates extend along a length of each of the one or more conductors and wherein each of the parallel conductive plates are electrically insulated from adjacent parallel conductive plates by a material of the housing.

8. The electrical conduit of claim 7, wherein the internal coolant passages are formed within the material of the housing, between the parallel conductive plates.

9. The electrical conduit of claim 6, wherein the one or more conductors are connected in series by a coupler configured to enable rotational motion of the one or more conductors around the coupler.

10. The electrical conduit of claim 6, wherein the one or more conductors have a linear or bent geometry and wherein the one or more conductors with the bent geometry includes one or more bends along a length of the one or more conductors.

11. A coupler for an electrical harness, comprising:
a journal supporting electrical bridges of different lengths, the electrical bridges arranged around a circumference of the journal and separated by a first set of insulating plates; and
end caps coupled to opposite ends of the journal, the end caps including indexing splines configured to interface with indexing splines of plate conductors rotatably coupled to the coupler.

12. The coupler of claim 11, wherein each of the end caps includes a collar protruding from an inner side of the end caps, the collar including sections extending to different points along a length of the journal.

13. The coupler of claim 12, wherein the first set of insulating plates protrude outward, away from the journal and extend along a length of the journal between the collar of each of the end caps and wherein the first set of insulating plates are inserted into slots in an outer surface of the journal.

14. The coupler of claim 11, further comprising a second set of insulating plates coupled to a deck of each of the electrical bridges.

15. The coupler of claim 11, further comprising a set of spring pushers inserted into internal channels of the journal extending from one end of the journal to a mid-point along a length of the journal, the spring pushers including a pin configured to protrude outwards, away from a central axis of rotation of the journal, through a hole in the journal.

* * * * *